Aug. 4, 1964  J. A. RYDBERG  3,143,160
FURNACE FOR INTERMITTENT COMBUSTION
Filed Sept. 20, 1961
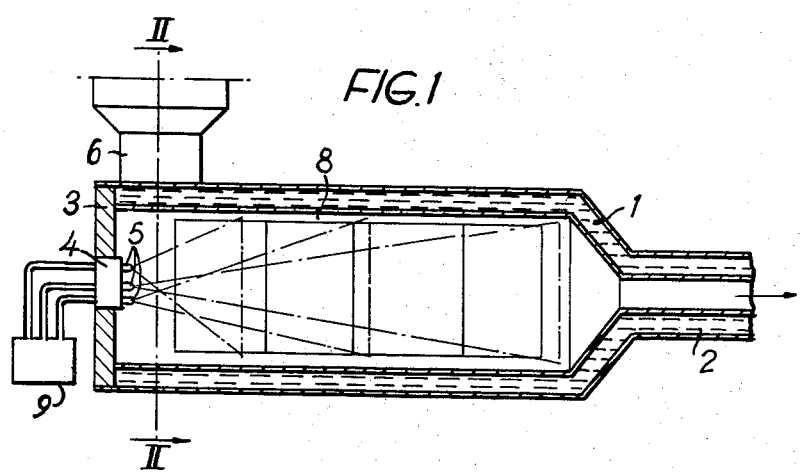
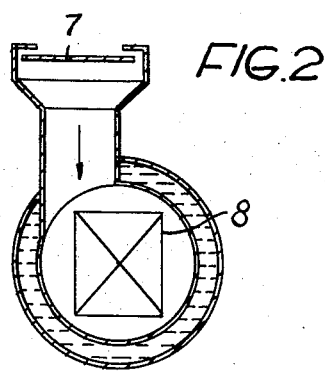

United States Patent Office 3,143,160
Patented Aug. 4, 1964

3,143,160
FURNACE FOR INTERMITTENT COMBUSTION
John Anders Rydberg, Stockholm, Sweden, assignor to Aktiebolaget Gustavsbergs Fabriker, Gustavsberg, Sweden, a corporation of Sweden
Filed Sept. 20, 1961, Ser. No. 139,499
Claims priority, application Sweden Sept. 22, 1960
1 Claim. (Cl. 158—4)

This invention relates to a furnace for intermittent combustion of preferably liquid fuel, comprising at least two fuel nozzles adapted to spread the injected atomized fuel over substantially the entire volume of the furnace. More specifically, the invention relates to furnaces of the same general type as the furnace according to my U.S. Patent No. 3,091,224, in which the air intake is provided with a non-return valve and is in open communication with an outlet duct and into which the fuel is supplied at a positively controlled frequency. In furnaces of this type the supply of combustion air takes place as a result of the suction action caused by the products of combustion which after each combustion are discharged at high velocities through the outlet duct. For various reasons, such a furnace should be long-shaped, and the invention provides a device which renders possible a great capacity while maintaining a favourable efficiency of combustion. In its broadest aspect, the invention is characterized by a lattice or similar device which occupies a substantial part of the furnace and consists of a refractory material, preferably heat-resisting steel, whereby in operation to cause substantially simultaneous ignition of the injected fuel throughout the entire volume of the furnace, resulting an a favourable influence upon the combustion.

An embodiment of the invention is illustrated in the accompanying drawing. FIG. 1 is a longitudinal section of a furnace devised in accordance with the invention, and FIG. 2 is a section on line II—II of FIG. 1.

The furnace 1 illustrated in the drawing is water-jacketed and in open communication with an outlet duct 2 which also is water-jacketed. The furnace may be part of, for instance, a heating boiler. It is in the form of a longitudinally extending tube and is covered, at the end remote from the outlet duct 2, by an end wall 3 in which there is provided a holder 4 for three fuel injection nozzles 5. Numeral 6 denotes an air intake which opens tangentially into the furnace immediately inside the end wall 3. Inserted into the air intake 6 is a non-return valve 7.

A lattice 8 of a refractory material is provided in the furnace 1. In the embodiment exemplified, the lattice is substantially square in section and extends substantially throughout the length of the furnace. This lattice may be made from wires, bars, tubes or other suitable profiles of heat-resisting steel.

The three fuel nozzles 5 are of different constructions. As shown by chain-dotted lines, the intermediate nozzle gives a fuel spray having a small cone angle and a great range, whereas the lower nozzle gives a fuel spray having a greater cone angle and a shorter range. The fuel spray coming from the upper nozzle has the greatest cone angle and the shortest range. As a result thereof, if fuel is supplied through all of the nozzles, the atomized fuel will be spread substantially uniformly over the entire volume of the furnace such that the composition of the fuel-air mixture will be substantially uniform in all parts of the furnace, resulting in favourable conditions for the ignition and combustion of the mixture.

At the start of the furnace an electric spark plug may be used for igniting the fuel-air mixture. After a short moment the lattice 8 has become incandescent under the influence of the products of combustion, whereupon the electric spark plug may be cut out. Since the lattice 8 occupies a substantial part of the furnace, it will cause, in its incandescent state, simultaneous ignition of the injected fuel throughout the entire volume of the furnace and contribute to a quick and complete combustion of the fuel.

The three fuel nozzles 5 may be supplied with fuel from individual cylinders in a common pump 9 the speed of which determines the frequency of combustion. However, in most cases the nozzles may be connected to a single pump cylinder. The fuel should be injected at least substantially simultaneously through all of the three nozzles.

In order to obtain a regular and uniform distribution of the fuel in the furnace, a plurality of nozzles may be distributed along the length of the furnace. In this case, the nozzles may be of identical constructions requiring equal fuel pressures and may be connected to a common pump cylinder.

In accordance with the locations of the nozzles they may be constructed such as to give fuel sprays of different kinds. In the embodiment exemplified, they may give sprays of different spray angles, for instance cone angles from 15° to 110°, and the sprays may be homogeneous throughout the entire cross-section or may have different fuel concentrations in their central parts and at their surfaces.

In the embodiment illustrated, the fuel is admitted to the furnace axially and centrally from the end wall 3, whereas the air is supplied tangentially so as to be given a rotary motion. It has proved that this arrangement results in a regular and steady combustion.

The invention may be applied also to gaseous or pulverized fuels.

What I claim is:

A furnace for intermittent combustion of fluid fuel comprising a furnace chamber, at least two fuel injection nozzles positioned together to spread injected fuel over substantially the entire volume of the furnace chamber, fuel supply means for intermittently supplying fuel substantially simultaneously to said nozzles at a positively controlled frequency, an air intake to said furnace chamber, a non-return valve controlling said air intake, a suction action creating outlet duct means in open communication with said furnace chamber to discharge gases from said chamber after each combustion causing fresh air to enter said chamber through said air intake, and a lattice which occupies substantially the entire volume of the furnace chamber and consists of a refractory material which becomes incandescent in operation and causes substantially simultaneous ignition of the injected fuel throughout the entire volume of the furnace chamber.

(References on following page)

References Cited in the file of this patent

UNITED STATES PATENTS

| | | | |
|---|---|---|---|
| 1,319,226 | Kirke | Oct. 21, | 1919 |
| 1,709,535 | McVay | Apr. 16, | 1929 |
| 1,978,517 | Wetherbee | Oct. 30, | 1934 |
| 2,137,185 | Seil | Nov. 15, | 1938 |
| 2,186,373 | Faulds | Jan. 9, | 1940 |
| 2,369,995 | Arnold | Feb. 20, | 1945 |
| 2,624,301 | Straitz | Jan. 6, | 1953 |
| 2,655,205 | Linderoth | Oct. 13, | 1953 |
| 2,722,180 | McIlvaine | Nov. 1, | 1955 |
| 2,743,575 | Brzozowski | May 1, | 1956 |
| 2,902,823 | Wagner | Sept. 8, | 1959 |
| 2,936,752 | Throckmorton et al. | May 17, | 1960 |

FOREIGN PATENTS

| | | | |
|---|---|---|---|
| 413,283 | Germany | May 5, | 1925 |
| 539,572 | Great Britain | Sept. 16, | 1941 |

OTHER REFERENCES

German printed application (Neumann), Serial No. N 8,684, printed June 7, 1956 ($80_c$ $14_{01}$).